United States Patent
Wang

(10) Patent No.: US 7,345,872 B2
(45) Date of Patent: Mar. 18, 2008

(54) HANDHELD ELECTRONIC DEVICE HAVING A COVER TURNABLE 360 DEGREES RELATIVE TO A BODY THEREOF

(75) Inventor: John C. Wang, Tao Yuan (TW)

(73) Assignee: High Tech Computer, Corp., Tao Yuan (TW)

( * ) Notice: Subject to any disclaimer, the term of this patent is extended or adjusted under 35 U.S.C. 154(b) by 501 days.

(21) Appl. No.: 11/004,303

(22) Filed: Dec. 3, 2004

(65) Prior Publication Data

US 2006/0007648 A1 Jan. 12, 2006

(30) Foreign Application Priority Data

Jul. 6, 2004 (TW) ............................. 93210614 U

(51) Int. Cl.
*G06F 1/16* (2006.01)
(52) U.S. Cl. ................. 361/683; 16/354; 312/223.1; 312/223.2
(58) Field of Classification Search ........ 361/679–683; 16/354; 248/917–923; 312/223.1, 223.2, 312/223.4
See application file for complete search history.

(56) References Cited

U.S. PATENT DOCUMENTS

| | | | | |
|---|---|---|---|---|
| 4,825,395 A | | 4/1989 | Kinser et al. | 364/708 |
| 5,898,600 A | | 4/1999 | Isashi | 364/705.01 |
| 5,987,704 A | * | 11/1999 | Tang | 16/354 |
| 6,519,812 B2 | * | 2/2003 | Ko et al. | 16/354 |
| 6,900,981 B2 | * | 5/2005 | Kuivas et al. | 361/683 |
| 2005/0122671 A1 | * | 6/2005 | Homer | 361/681 |

* cited by examiner

*Primary Examiner*—Jayprakash Gandhi
*Assistant Examiner*—Anthony Q Edwards
(74) *Attorney, Agent, or Firm*—J.C. Patents

(57) ABSTRACT

A handheld electronic device (300) mainly comprises a cover (310), a main body (320), a monitor (328) mounted on the main body, a keyboard (318) mounted on the cover and a hinge structure (330) to which pivot portions (312), (322) of the cover and main body are hinged. The pivot portions have teeth (314), (324) on circumferential peripheries thereof. The teeth mesh with each other. The cover can rotate for 360 degrees relative to the main body thereby moving from a first position to a second position, wherein at the first position, the cover abuts against a top surface (326) of the main body, and at the second position, the cover abuts against a bottom surface of the main body. The trajectory of the cover during its rotation relative to the main body follows a predetermined path.

12 Claims, 17 Drawing Sheets

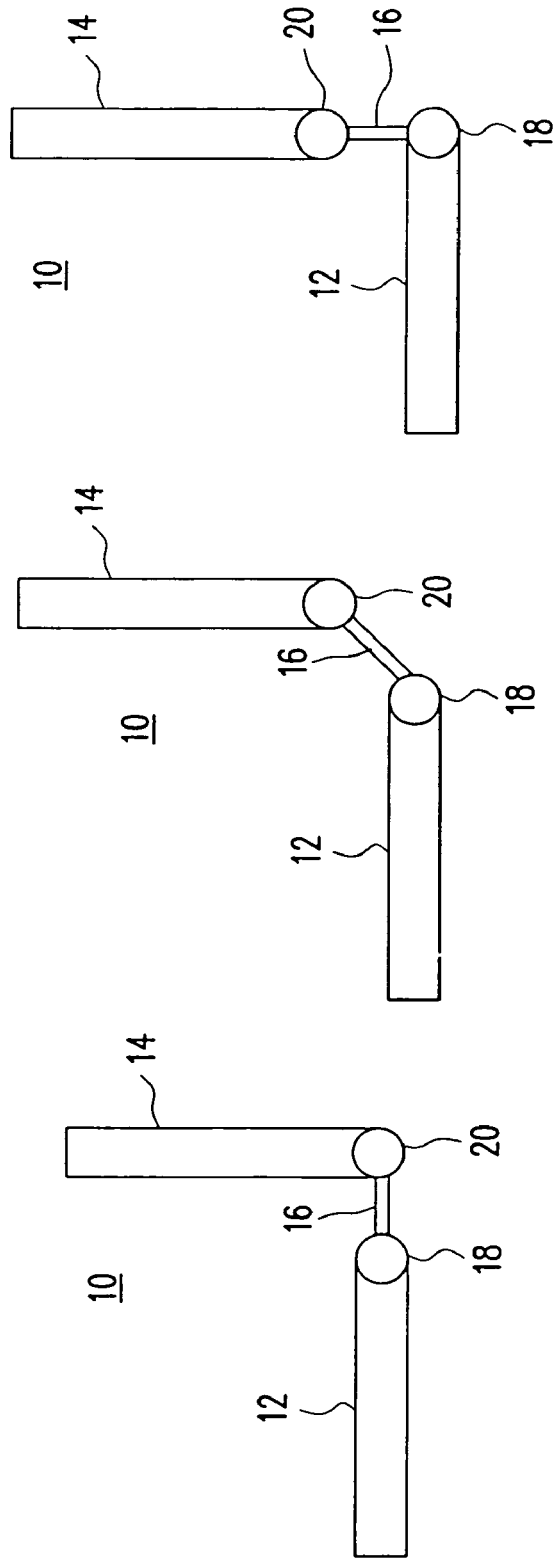

HANDHELD ELECTRONIC DEVICE HAVING A COVER TURNABLE 360 DEGREES RELATIVE TO A BODY THEREOF

CROSS-REFERENCE TO RELATED APPLICATION

The present invention was first described in Disclosure Document Registration 537,979 filed on Sep. 8, 2003 under 35 U.S.C. .sctn.122, 37 C.F.R. .sctn.1.14 and MPEP .sctn. 1706. This application claims the benefit of Taiwan application Serial No. 93210614, filed on Jul. 6, 2004.

BACKGROUND OF THE INVENTION

1. Field of the Invention

The present invention relates to a handheld electronic device. More particularly, the present invention relates to a handheld electronic device having a cover and a body; the cover can rotate 360 degrees relative to the body.

2. Description of the Related Art

Handheld electronic device is now a widely adopted term referring to those small and portable electronic devices such as mobile phones, pocket personal computers, electronic games, electronic dictionaries, personal digital assistants or portable personal computers. Because handheld electronic devices can be interconnected through wireless communication systems or the Internet, it is a versatile and efficient piece of high-tech mobile information processing equipment.

FIGS. 1A and 1B show a conventional flip-top handheld electronic device at closed and opened positions. The device has a flip cover 110 and a main body 120, which are hinged together through a hinge structure 130. The hinge structure 130 is a single pivot structure. Due to structural interference between the flip cover 110 and the main body 120, the flip cover 110 cannot be rotated 360° relative to the main body 120 to rest on a bottom surface of the main body 120, which is desirable in some applications, for example, when a user needs to use a stylus (not shown) to input information through a stress-sensitive touch screen (not shown) on the flip cover 110 of the device.

FIG. 2 is a perspective view of another conventional handheld electronic device. As shown in FIG. 2, the device has a main body 220 and a cover 210. A screen 212 is provided on the cover 210 and a keyboard 222 is provided on the body 220. The cover 210 is connected to the main body 220 through a hinge structure including a first pivot 230 and a second pivot 232. The first pivot 230 enables the cover 210 to rotate relative to the main body 220 on a vertical plane, and the second pivot 232 enables the cover 210 to rotate relative to the main body 220 on a horizontal plane, whereby the cover 210 can be moved to rest on a top surface (not labeled) of the main body 220 with the screen 212 faces upwardly. Although the hinge structure of FIG. 2 enables a user to input information to the device through use of a stylus tapping on the screen 212, this type of hinge structure enabling two-plane rotation is complicated and expensive to produce.

In U.S. Pat. No. 4,825,395, a two axis articulated hinge design for connecting the two casings of an electronic computer is disclosed. The advantage of using the two-axis articulated hinge structure is that structural interference will not occur, and one of the casings can be directly rotated to rest on the other from a top surface to a bottom surface thereof. However, one major disadvantage for this design is that there is no fixed relative position between the two casings except at the two end positions in which the two casings rest on each other. The hinge structure of another U.S. Pat. No. 5,898,600 also has similar problem regarding the relative positioning between the casings.

The problem of not having a fixed relative position between the two casings of a flip type handheld electronic device as in the aforementioned hinge designs can be explained with respect to FIGS. 2A through 2C. FIGS. 2A through 2C are side views of a conventional two-axis handheld electronic device. As shown in FIGS. 2A through 2C, a handheld electronic device 10 has a first casing 12, a second casing 14 and a connecting plate 16 with two edges connected to hinge axes 18, 20 of the first and the second casings 12, 14 respectively. When the second casing 14 is rotated to a vertical position relative to the first casing 12, the connecting plate 16 can be disposed in a horizontal position (shown in FIG. 2A), a slant position (shown in FIG. 2B), a vertical position (shown in FIG. 2C) or any position in-between. Since the orientation of the connecting plate 16 is quite arbitrary, the first casing 12 and the second casing 14 are not fixed relative to each other. Such an inability to fix the relative position between the two casings 12, 14 at a position between the end positions is undesirable.

SUMMARY OF THE INVENTION

Accordingly, at least one objective of the present invention is to provide a handheld electronic device having no structural interference between its cover and main body so that the cover can rotate by an angle up to 360° relative to the main body, whereby the cover can rest on either a top surface or a bottom face of the main body through a simple rotation of the cover relative to the main body.

At least a second objective of the present invention is to provide a handheld electronic device having a secure and reliable relative positioning between its cover and main body when the cover is rotated by an angle up to 360° relative to the main body.

To achieve these and other advantages and in accordance with the purpose of the invention, as embodied and broadly described herein, the invention provides a handheld electronic device. The handheld electronic device mainly comprises a first casing, a second casing and a hinge structure. The first casing has a first pivot portion and the second casing has a second pivot portion. Each of the first and the second pivot portion has a plurality of protruding teeth. The teeth of the first pivot portion mesh with the teeth of the second pivot portion. The hinge structure has two axle rods around which the first and second pivot portions rotate, respectively. The two axle rods are securely fastened to two axle caps respectively at two opposite ends of the axle rods. Through this design, the first casing can rotate by an angle up to 360° relative to the second casing and a relative position between the two casings during the rotation can be deterministic.

The present invention also provides an alternative handheld electronic device comprising a first casing, a second casing, a hinge structure and a lever wherein the hinge structure and the lever connect the first and second casings together. The first casing can rotate relative to the second casing. The first casing and the second casing have a first pivot portion and a second pivot portion, respectively. The hinge structure has first and second pivots which are respectively connected to the first and second pivot portions of the first and second casings. The lever has a first end and a second end that are fastened to the first casing and the second casing, respectively. The first end and the second end of the lever are located at different sides of a line joining axes of the first and the second pivot portions.

In the present embodiment, assuming that a distance between the first end of the lever and the axis of the first pivot portion is X and a distance between the second end of the lever and the axis of the second pivot portion is Y, a length of the lever between the first and second ends is S and a distance between the axis of the first pivot portion and the axis of the second pivot portion is R. The relationship between X, Y, S and R is S>R, S+Y=R+X and $S^2=R^2+(X+Y)^2$. By such geometric relation between the first and second casings, the hinge structure and the lever, the first casing can rotate smoothly up to an angle of 360° relative to the second casing without any interference between the two casings, and during the rotation the relative position between the two casings can be deterministic.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A through 2C are side views of a conventional two-axis handheld electronic device.

DESCRIPTION OF THE PREFERRED EMBODIMENTS

Figure 1A:
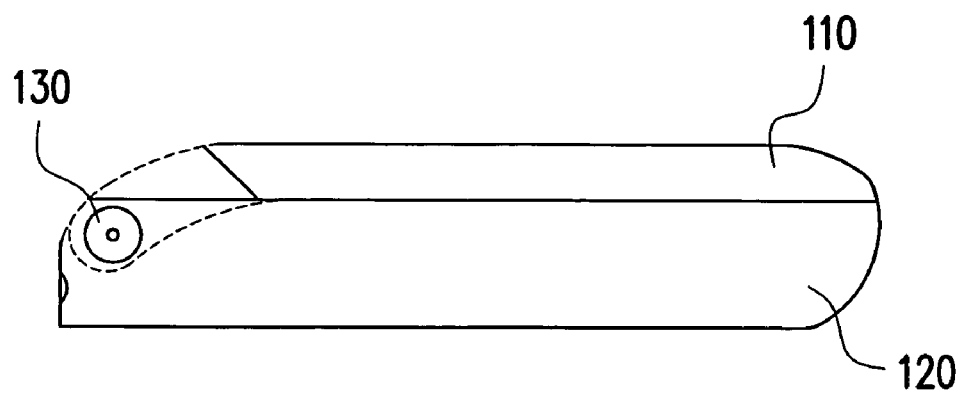
FIGS. 1A and 1B show a conventional handheld electronic device with a flip cover at closed and opened positions relative to a main body thereof.
Figure 1B:
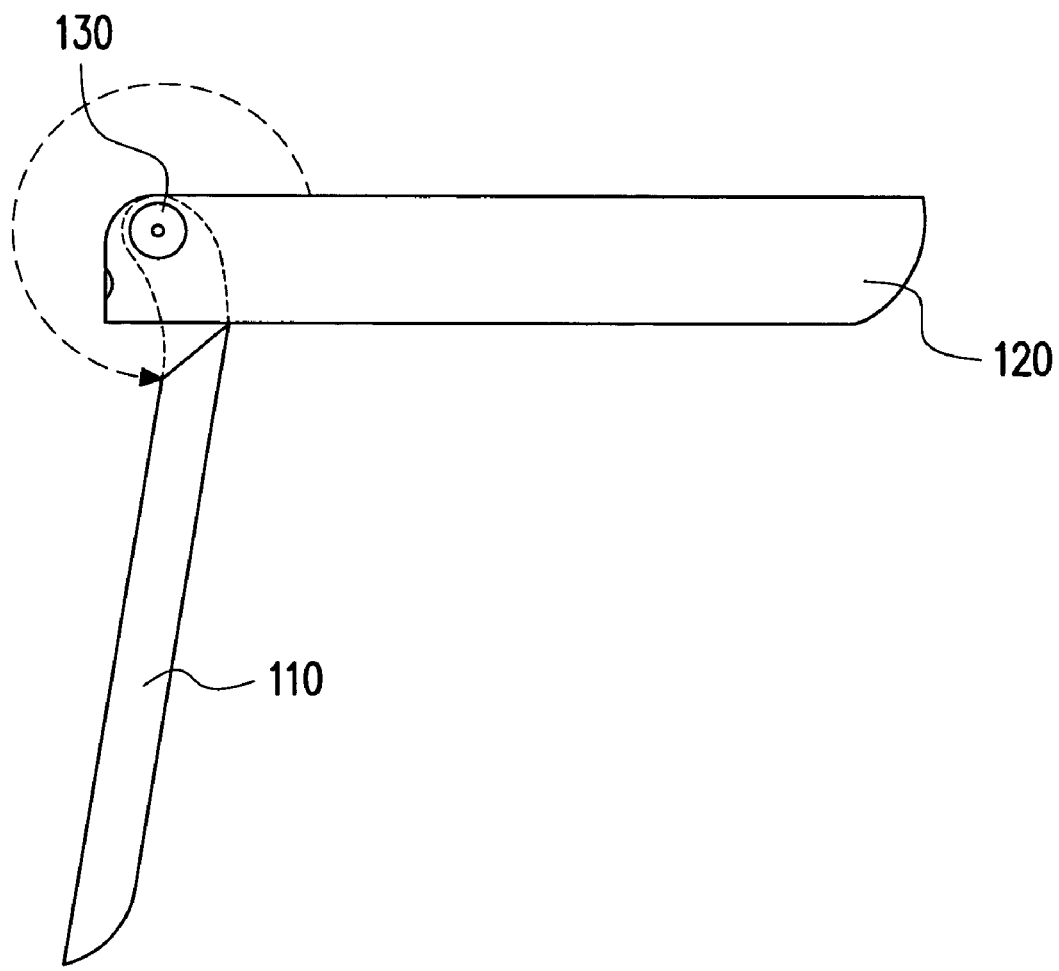
Figure 2:
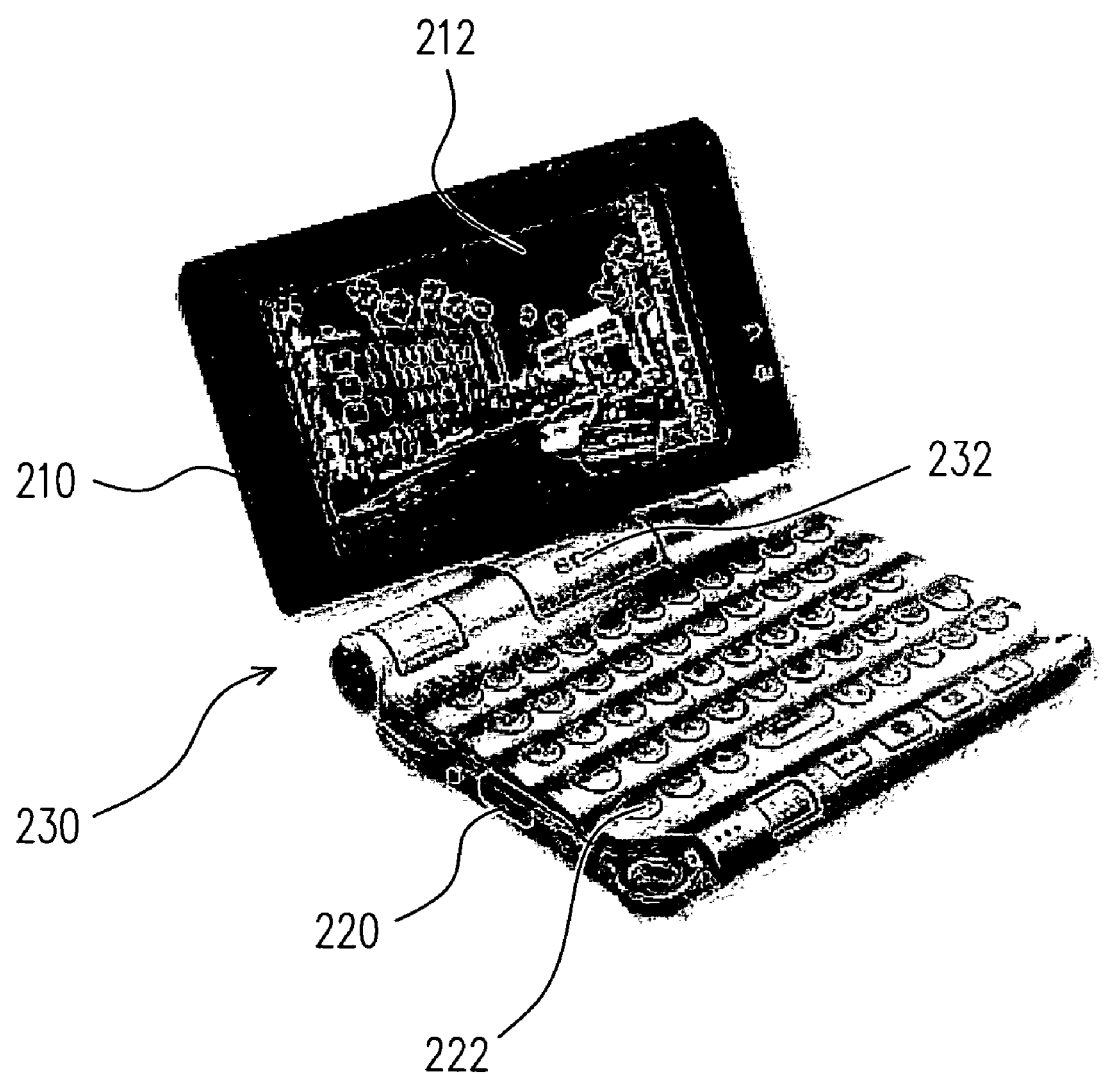
FIG. 2 is a perspective view of another conventional handheld electronic device.

Reference will now be made in detail to the present preferred embodiments of the invention, examples of which are illustrated in the accompanying drawings. Wherever possible, the same reference numbers are used in the drawings and the description to refer to the same or like parts.

Figure 3:
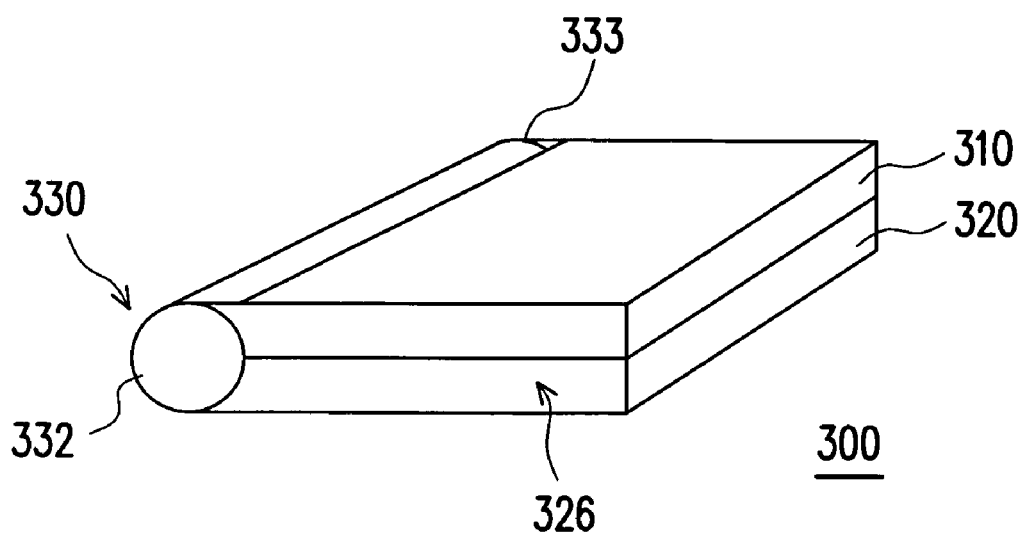
FIG. 3 is a perspective view of a handheld electronic device according to a first preferred embodiment of the present invention at a closed position.
Figure 4:
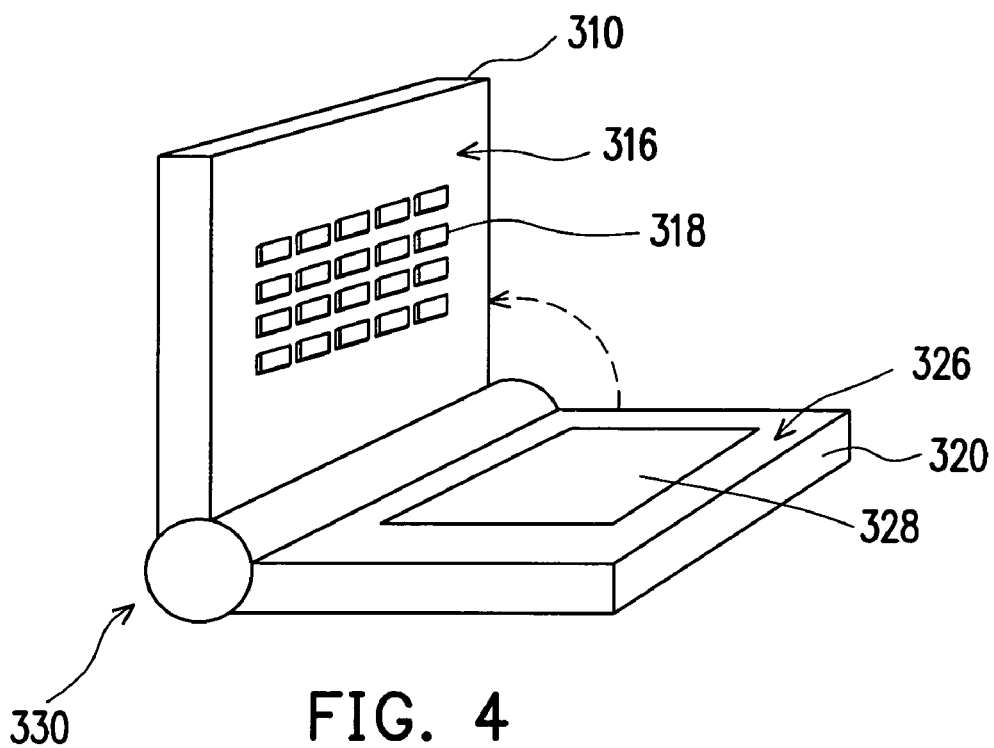
FIGS. 4, 5, 6 and 7 are perspective views respectively showing the cover of the handheld electronic device of FIG. 3 being rotated by an angle of 90°, 180°, 270° and 360° relative to the main body of the device.
Figure 5:
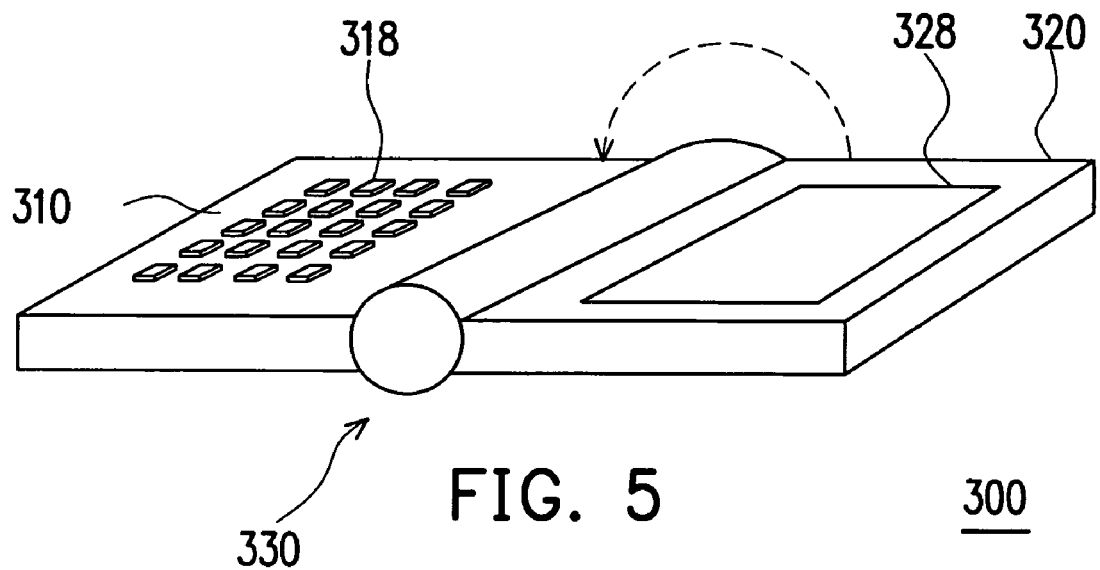
Figure 6:
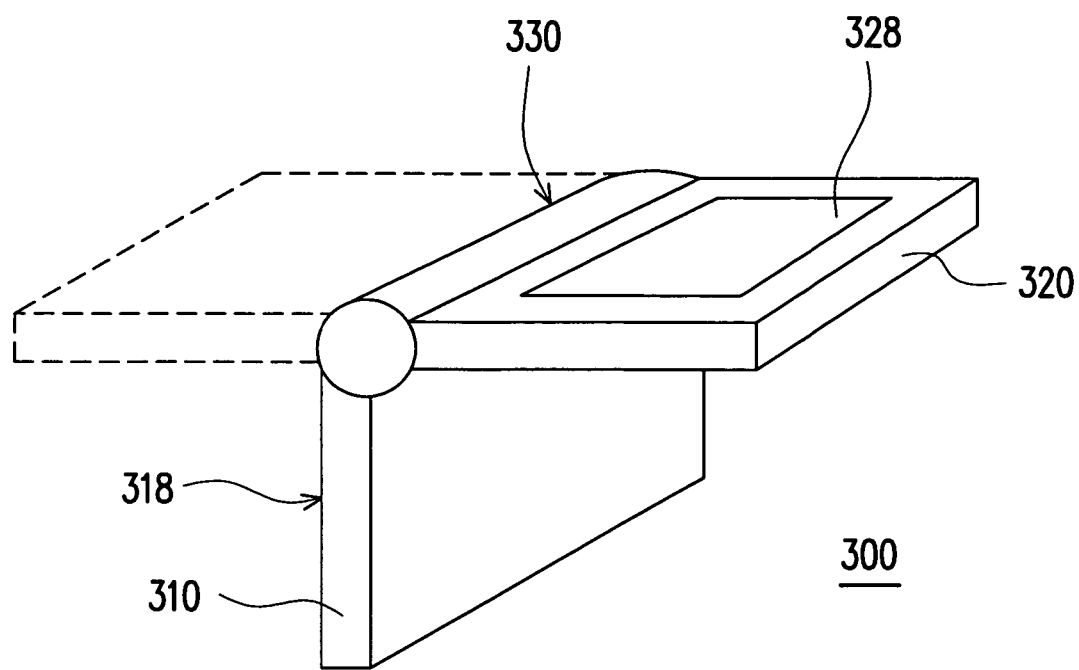
Figure 7:
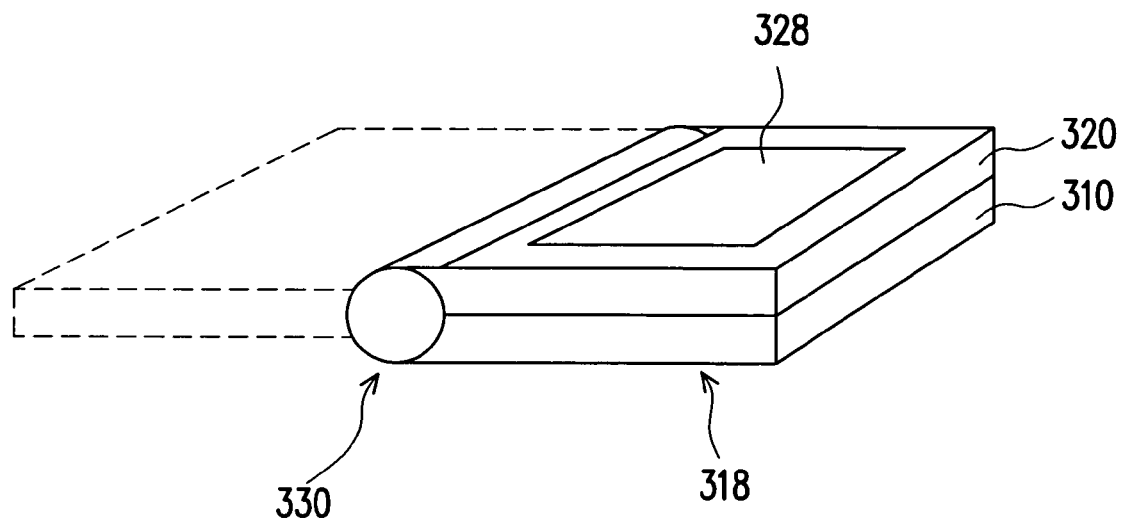

FIG. 3 is a perspective view of a handheld electronic device 300 according to a first preferred embodiment of the present invention. FIG. 4 shows a cover 310 of the handheld electronic device 300 of FIG. 3 being rotated by 90° relative to a main body 320 thereof. FIG. 5 shows the cover 310 being rotated by 180°. FIG. 6 shows the cover 310 being rotated by 270°. FIG. 7 shows the cover 310 being rotated by 360°.

Figure 3A:
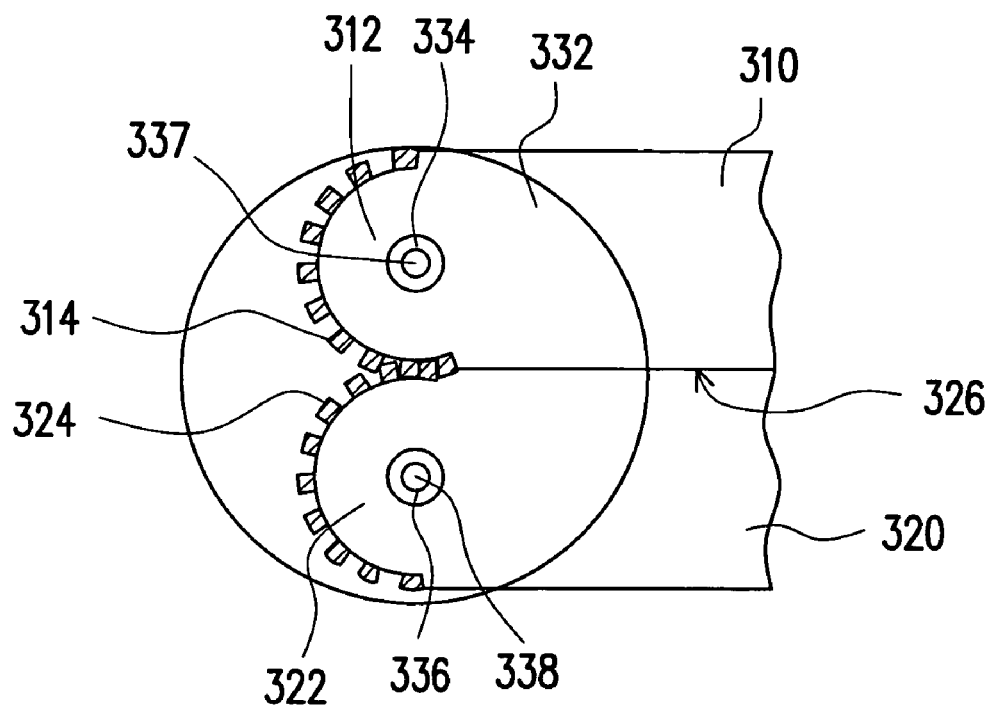
FIG. 3A is a magnified, cross-sectional view of a portion of the handheld electronic device of FIG. 3, showing details of a hinge connection between a cover and a main body of the handheld electronic device.

As shown in FIG. 3, the handheld electronic device 300 mainly comprises the cover 310, the main body 320 and a hinge structure 330. FIG. 3A is a magnified, cross-sectional view of the hinge structure 330 shown in FIG. 3. In the present embodiment, the cover 310 and the main body 320 have a first pivot portion 312 and a second pivot portion 322, respectively. Each of the first and the second pivot portions 312, 322 has a plurality of protruding teeth 314, 324 on a circumferential periphery thereof, which has a profile generally of a semicircle. The teeth 314, 324 mesh with each other.

Figure 3B:
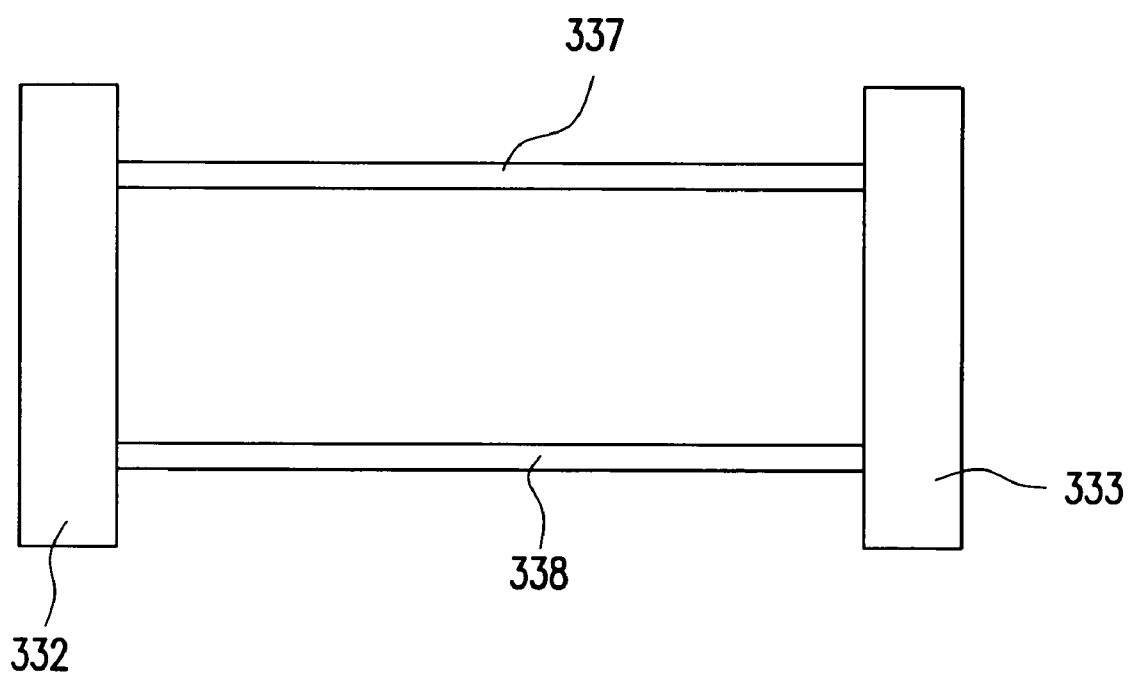
FIG. 3B is a magnified, top view of two axle rods and two rod caps of the handheld electronic device of FIG. 3.

The hinge structure 330 in FIG. 3A comprises a first axle bushing 334 and a second axle bushing 336 respectively secured to the first pivot portion 312 and the second pivot portion 322. Also referring to FIG. 3B, two axle rods 337, 338 each have two opposite ends respectively secured to two axle caps 332, 333. The axle rods 337, 338 respectively extend in the axle bushings 334, 336 so that the first and second pivot portions 312, 314 can rotate respectively about the axle rods 337, 338. The pivot portions 312, 314 are lengthwise sandwiched between the axle caps 332, 333 so that lengthwise relative movement between the first and second pivot portions 312, 314 is restrained.

Figure 4A:
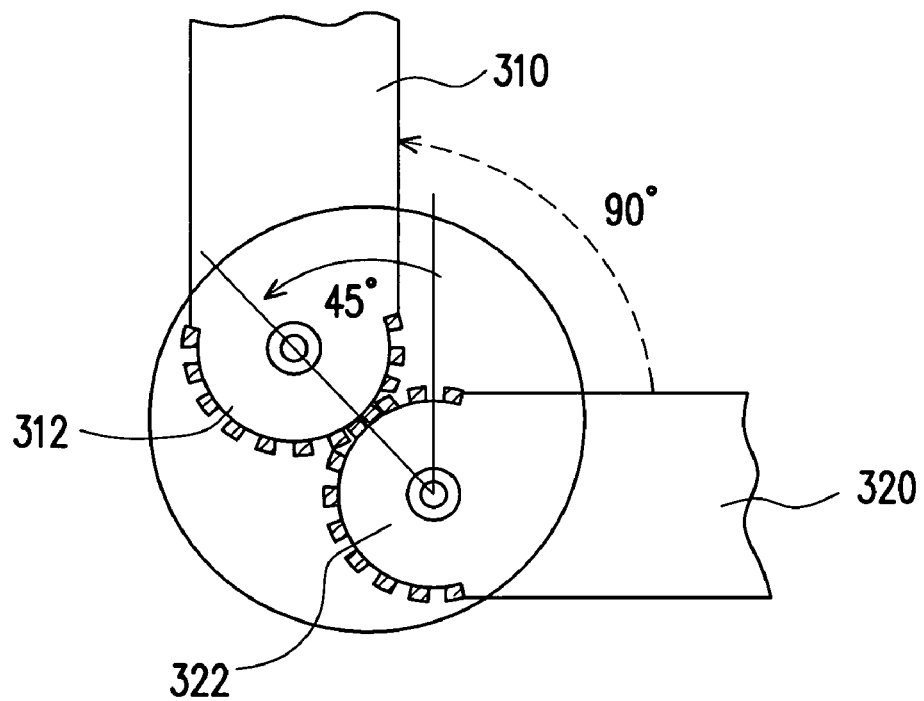
FIGS. 4A, 5A, 6A and 7A are views similar that of FIG. 3A, respectively showing details of the hinge connection of FIGS. 4, 5, 6 and 7.
Figure 5A:
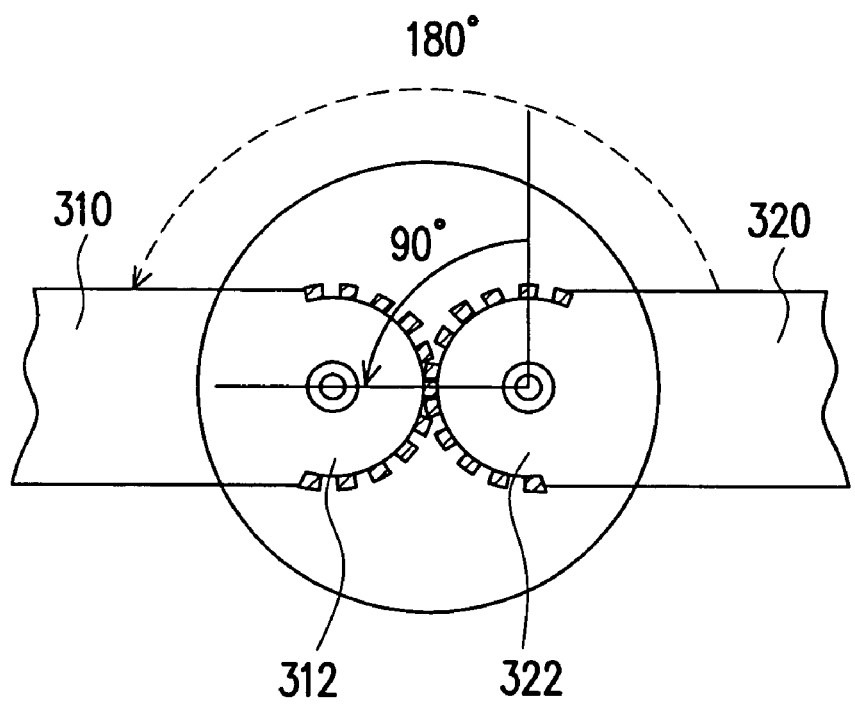
Figure 6A:
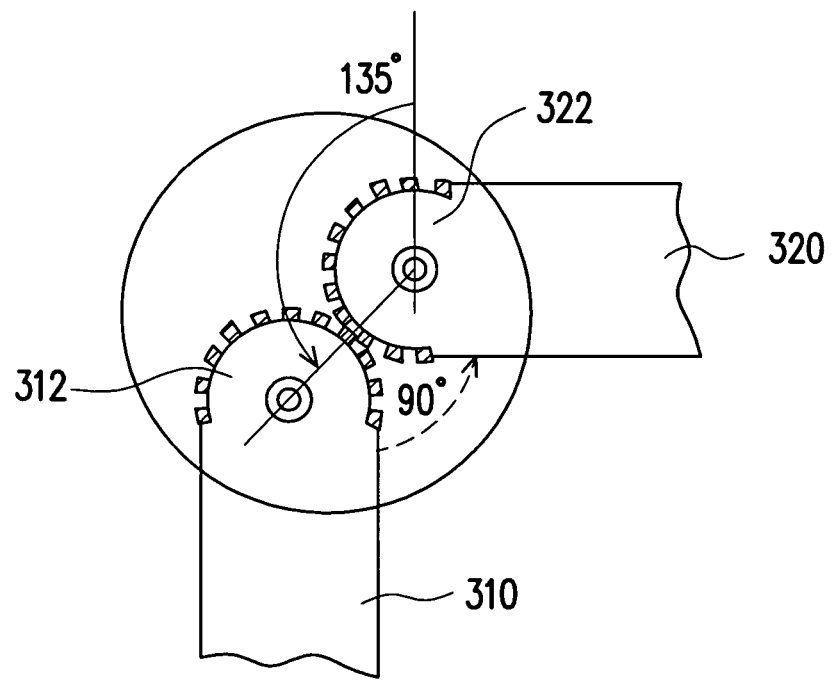
Figure 7A:
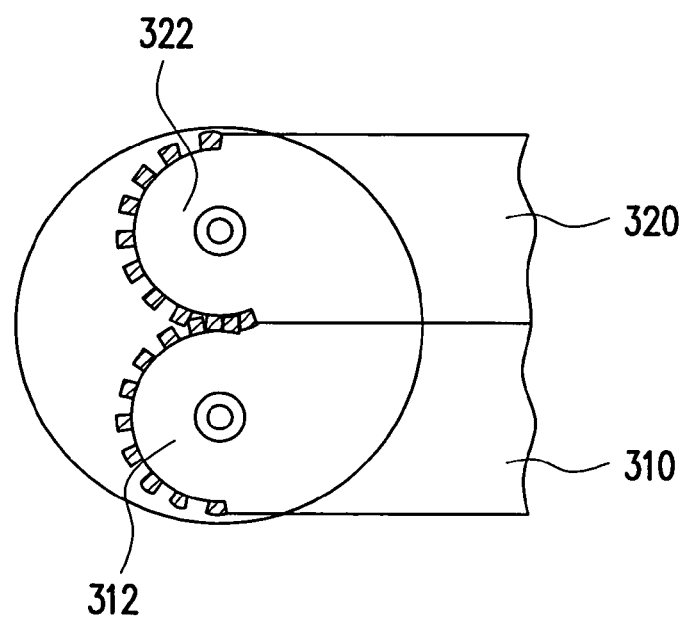

In the following please also refer to FIGS. 3~7A to understand the relative movement between the cover 310 and the main body 320 at different positions. As shown in FIGS. 3 and 3A, when the cover 310 covers a top surface 326 of the body 320 on which a monitor 328 (FIG. 4A) is disposed, the protruding teeth 314, 324 on the first pivot portion 312 and the second pivot portion 322 which are located proximate to the surface 326 mesh with each other. As shown in FIGS. 4 and 4A, to open the cover 310 for 90 degrees relative to the main body 320, the axle rod 337 rotates for 45 degrees relative to the axle rod 338. At this position, the monitor 328 on the main body 320 and a keyboard 318 on a bottom surface 316 of the cover 310 are exposed. The monitor 328 and the keyboard 318 face each other and are oriented perpendicularly to each other so that a user can easily input information into the device 300 through typing the keyboard 318, and check the correctness of the input information through looking at the monitor 328 when the cover 310 is oriented horizontally and the main body 320 is oriented vertically. As shown in FIGS. 5 and 5A, to open the cover 310 for 180 degrees relative to the main body 320, the axle rod 337 rotates for 90 degrees relative to the axle rod 338. At this position, the cover 310 and the main body 320 extend substantially on a common plane. As shown in FIGS. 6 and 6A, to open the cover 310 for 270 degrees relative to the main body 320, the axle rod 337 rotates relative to the axle rod 338 for 135 degrees. Finally, as shown in FIGS. 7 and 7A, to open the cover 310 for 360 degrees relative to the main body 320, the axle rod 337 rotates relative to the axle rod 338 for 180 degrees. At this position, the cover 310 abuts against a bottom surface (not labeled) of the main body 320, and the user can easily input information to the device 300 through use of a stylus (not shown) tapping on the monitor 328, which in the preferred embodiment is a touch screen. Furthermore, at this position, the user can easily use the device 300 as a wireless Internet browser or a wireless PDA phone. In a word, at the configuration of FIG. 7, the device 300 can be used as a wireless PDA with a structure of a single slate. To close the device, the user only needs to move the cover 310 relative to the main body 320 in a reverse direction.

It should be noted that the cover 310 can be rotated further from the flat-out configuration shown in FIG. 5 to the configuration in FIG. 7 without any structural interference between the cover 310 and the main body 320. Consequently, the cover 310 is free to rotate 360° from the closed position shown in FIG. 3 to the one in FIG. 7 to enable the main body 320 to be located beneath the main body 320. In the configuration of FIG. 7, the keyboard 318 on the cover 310 and the monitor 328 on the body 320 face opposite directions.

Accordingly, the first embodiment of the present invention utilizes axle caps 322, 334 and axle rods 337, 338 to connect the cover 310 and main body 310, 320 together. By meshing the protruding teeth 314, 324 distributed on the circumferential peripheries of the first and the second pivot portions 312, 322, the cover 310 is free to rotate by an angle up to 360 degrees relative to the main body 320. Furthermore, the cover 310 follows a predetermined trajectory during its rotation relative to the main body 320. In other words, in the present invention, the relative position between the main body 320 and the cover 310 is always ascertained during the relative rotation there between; thus, the present invention can resolve the problem of the prior art device.

Figure 8:
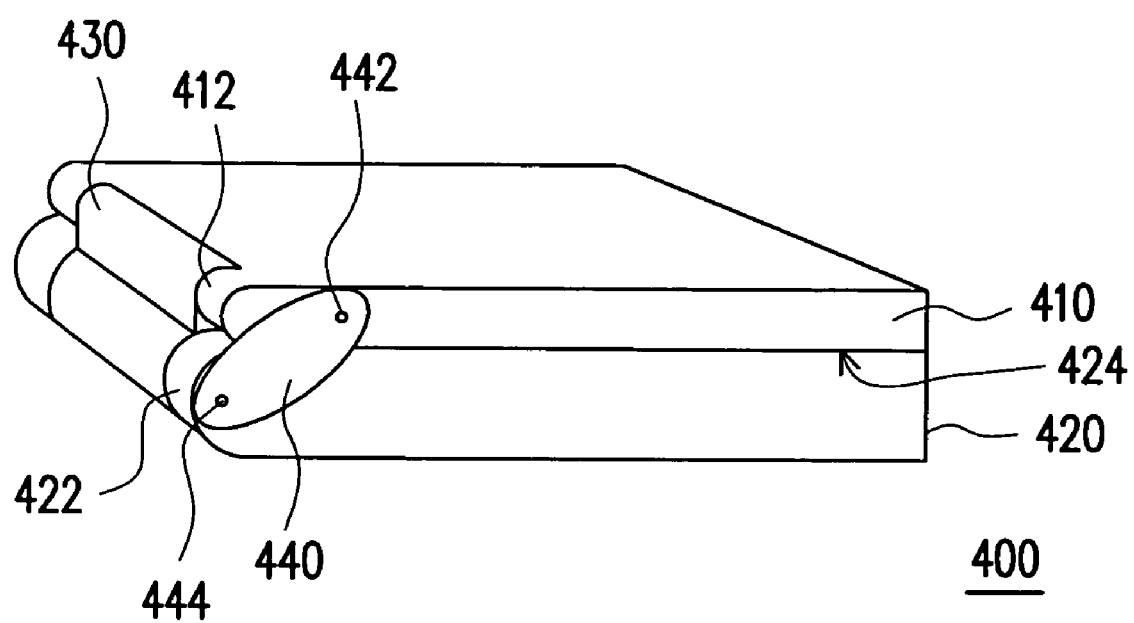
FIG. 8 is a perspective view of a handheld electronic device according to a second preferred embodiment of the present invention.
Figure 8A:
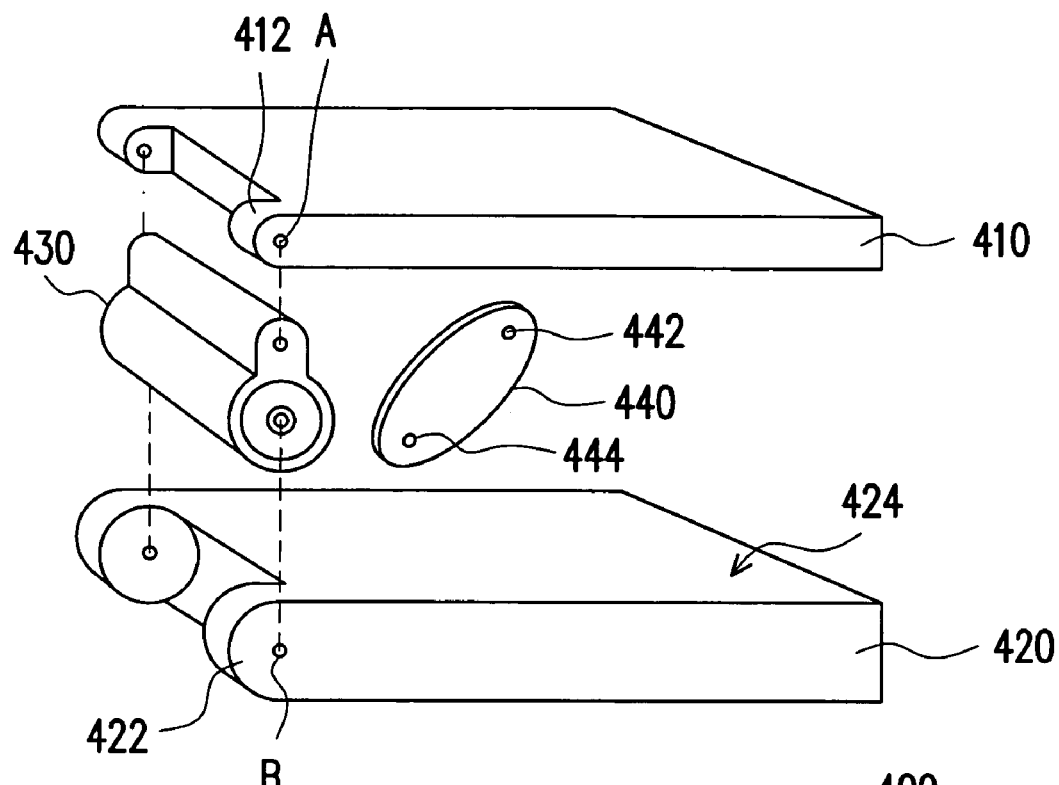
FIG. 8A is an exploded view of the handheld electronic device shown in FIG. 8.
Figure 8B:
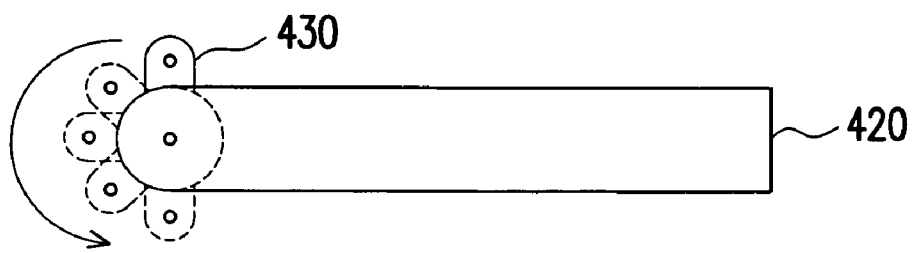
FIG. 8B is a diagram showing the movement of a hinge structure of the handheld electronic device shown in FIG. 8A.
Figure 8C:
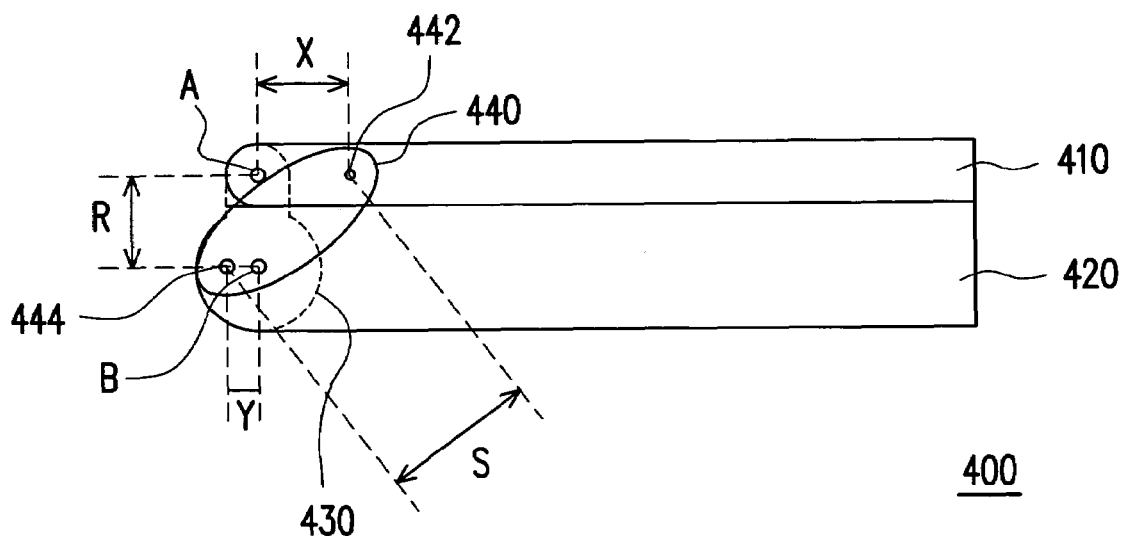
FIG. 8C is a side view of the handheld electronic device shown in FIG. 8.
Figure 8D:
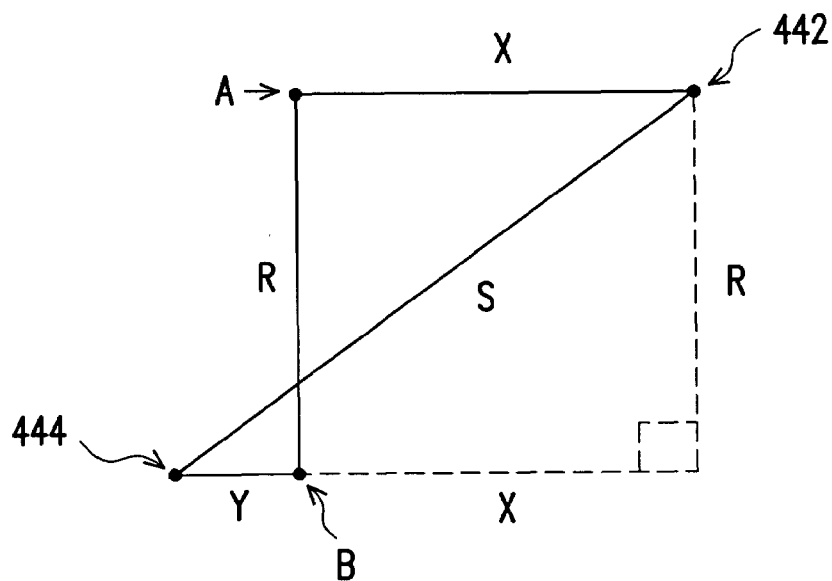
FIG. 8D is a diagram showing a geometric relationship between the hinge structure and a lever of the handheld electronic device of FIG. 8C.

FIG. 8 is a perspective view of a handheld electronic device 400 according to a second preferred embodiment of the present invention. FIG. 8A is an exploded view of the handheld electronic device 400 of FIG. 8. FIG. 8B is a diagram showing a movement of a hinge structure 430 of the handheld electronic device 400 during a rotation of a cover 410 relative to a main body 420 thereof. FIG. 8C is a side view of the handheld electronic device 400 at a closed position. FIG. 8D shows a geometric relationship between a lever 440 and the hinge structure 430 of the handheld electronic device 400 of FIG. 8C.

As shown in FIG. 8, the handheld electronic device 400 is a wireless personal digital assistant. The handheld electronic device 400 mainly comprises the cover 410, the main body 420, the hinge structure 430 and the lever 440. In the present embodiment, the cover 410 and the main body 420 have a first pivot portion 412 and a second pivot portion 422, respectively. The first and the second pivot portions 412, 422 are hinged to the hinged structure 430. Although in this embodiment the cover 410 has a thickness smaller than that of the main body 420, it is understood that the cover 410 can have a thickness equal to that of the main body 420. In contrast to this embodiment, in the first embodiment of FIG. 3, the cover 310 of the handheld electronic device 300 must have a thickness equal to that of the main body 320. The main body 420 can be equipped with a keyboard (not shown), while the cover 410 can be equipped with a display screen (not shown).

As shown in FIG. 8B, the hinge structure 430 has a dual-axis hinge design with one axis hinged to an axis A of the first pivot portion 412 of the cover 410 and the other axis hinged to an axis B of the second pivot portion 422 of the main body 420. One major advantage of this arrangement is that the cover 410 is able to rotate up to 360° relative to the main body 420 through the hinge structure 430 without any structural interference between the cover 410 and the main body 420. However, such connection cannot achieve the object of the present invention: to conform to a deterministic relative position of the cover 410 to the main body 420 during the rotation of the cover 410. To achieve the object, the lever 440 is introduced to work in tandem with the hinge structure 430 so that a certain relative position is provided and the connection structure is strengthened. As shown in FIG. 8, the lever 440 has a first end 442 and a second end 444. The first end 442 is hinged to the first casing 410 and the second casing 444 is hinged to the second casing 420. Furthermore, the first end 442 and the second end 444 are located on different sides of an imaginary line joining the axis A of the first pivot portion 412 and the axis B of the second pivot portion 422.

Figure 10:
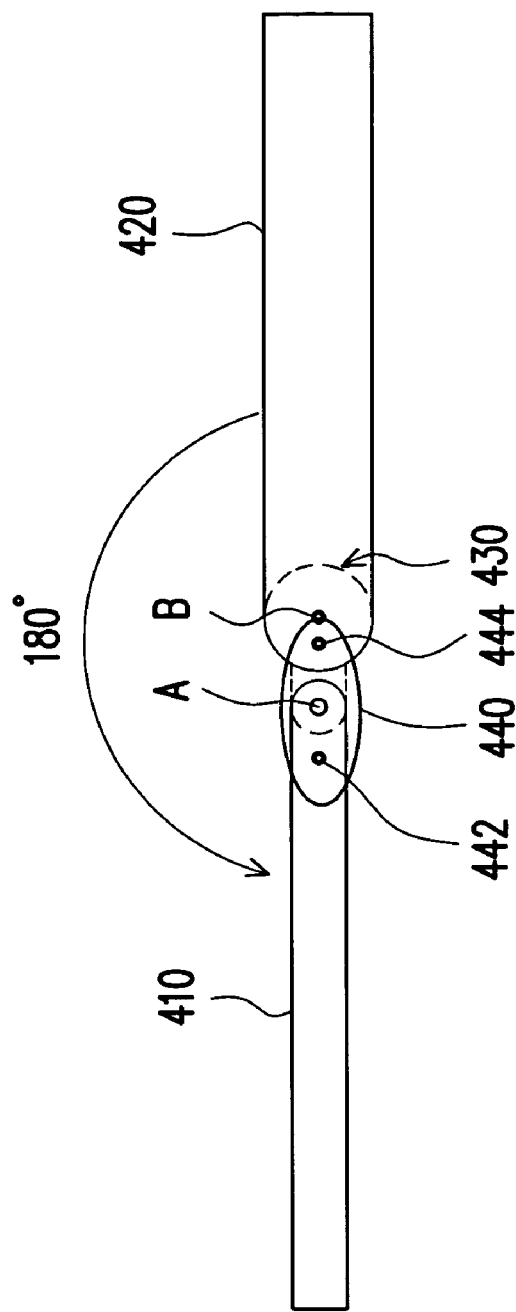
Figure 10A:
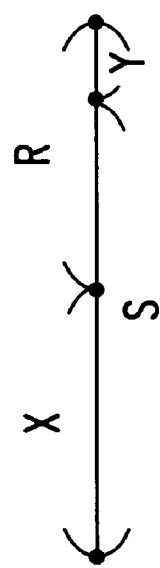
FIG. 10A is a diagram showing a geometric relationship between the hinge 5 structure and the lever of the handheld electronic device of FIG. 10.

According to the present invention, the first and second ends 442, 444 of the lever 440 are hinged to points of the cover 410 and main body 420 other than the axes A, B of the first and the second pivot portions 412, 422 thereof. As shown in FIGS. 8C, 8D, assuming a distance between the first end 442 of the lever 440 and the axis A of the first pivot portion 412 is X, a distance between the second end 444 of the lever 440 and the axis B of the second pivot portion 420 is Y. The lever 440 has a length of S between the two ends 442, 444 thereof and the hinge structure 430 has a length of R between the two axes A, B thereof. Then, the values of X, Y, S and R must satisfy the following equations in order for the cover 410 to move smoothly and reliably along a predetermined path relative to the main body 420. The equations are:

$$S^2 = R^2 + (X+Y)^2 \text{ (as shown in FIG. 8D);}$$

$$S+Y=R+X \text{ (as shown in FIG. 10A).}$$

Figure 9:
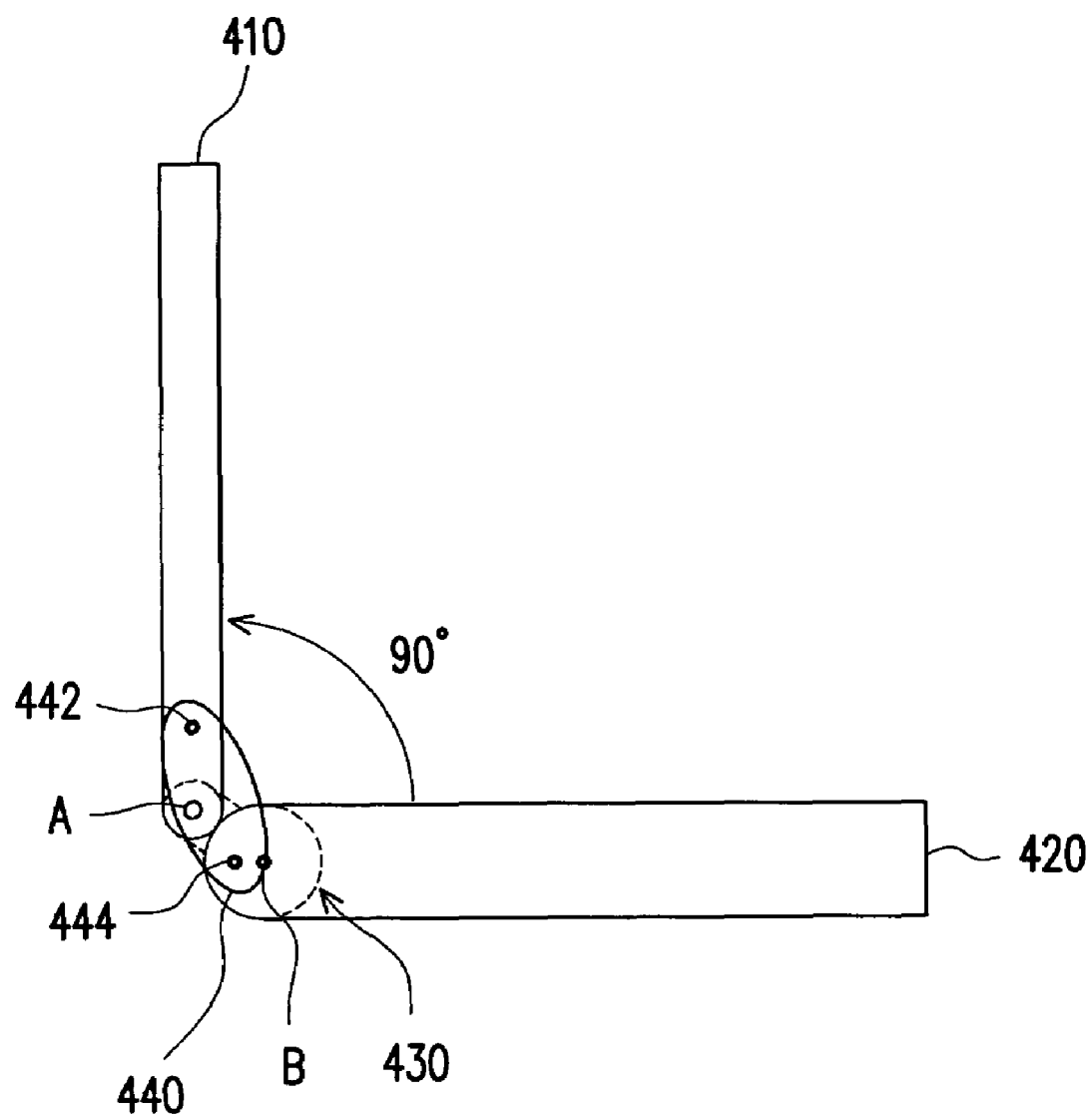
FIGS. 9, 10, 11 and 12 are side views showing a cover of the handheld electronic device in FIG. 8 being rotated by an angle respectively of 90°, 180°, 270° and 360° relative to a main body thereof.
Figure 11:
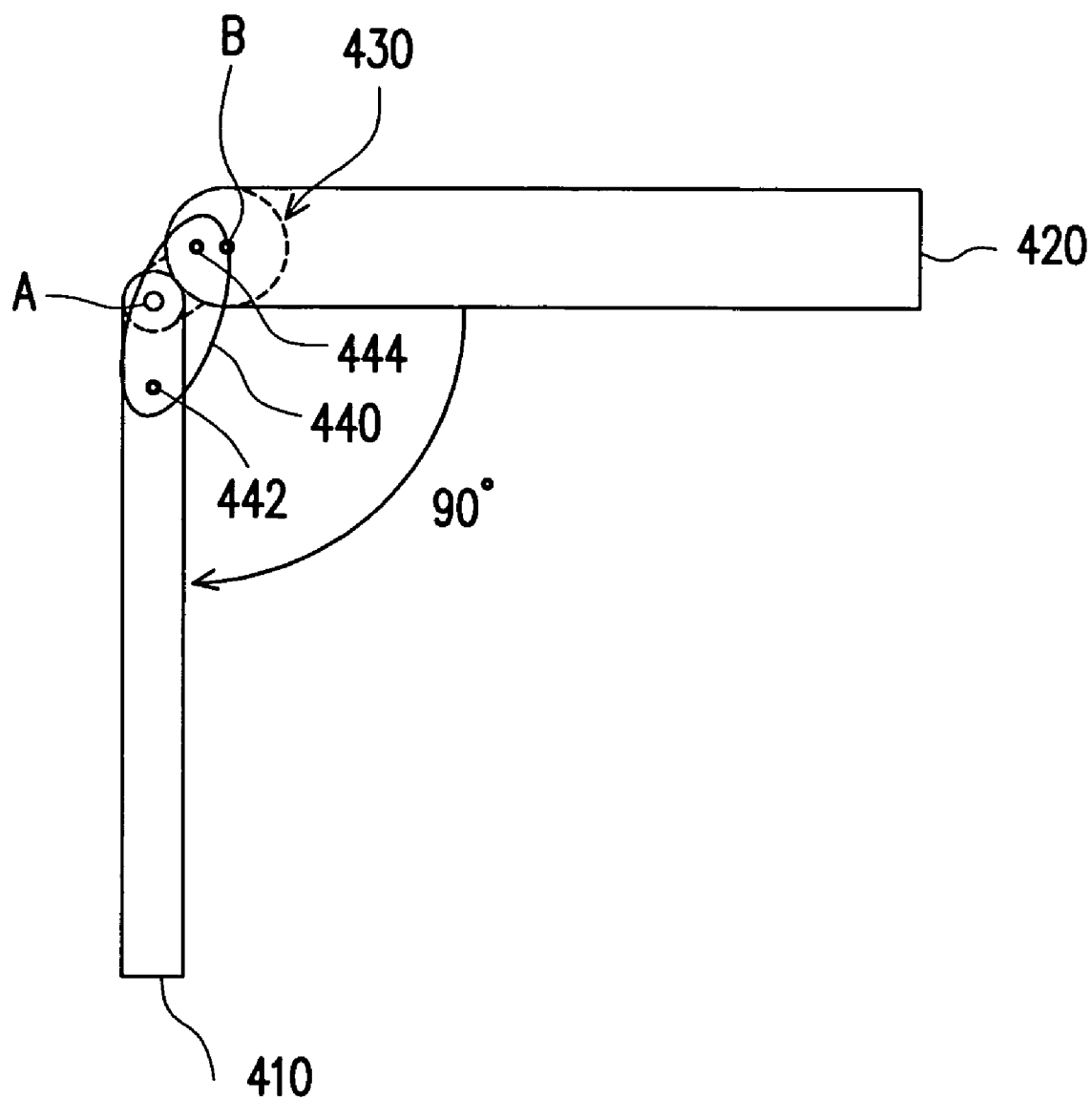
Figure 12:
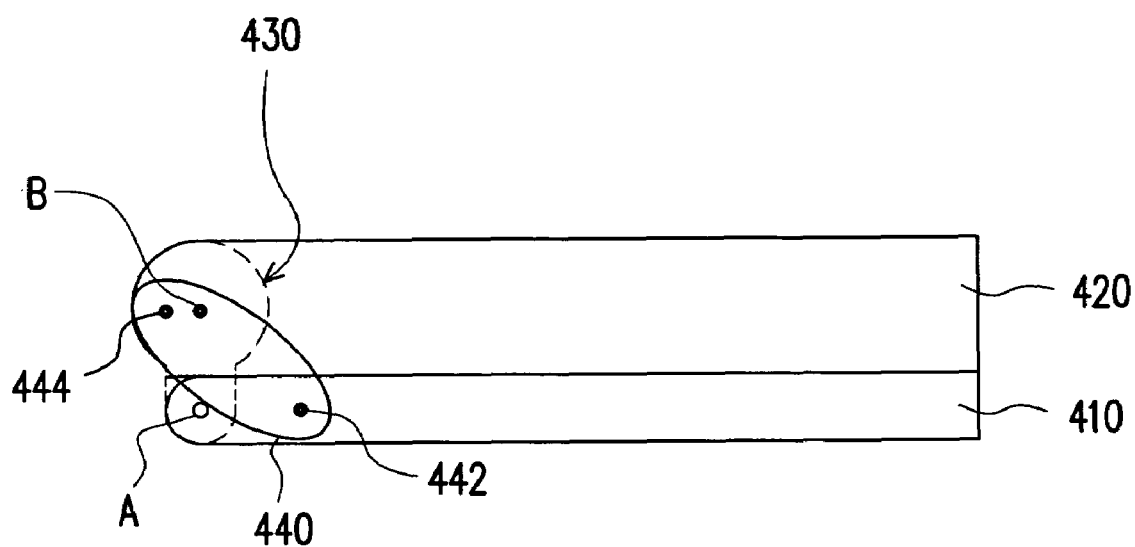

FIG. 9 is a side view showing the cover 410 of the handheld electronic device 400 in FIG. 8 being rotated by an angle of 90° relative to the main body 420. FIG. 10 is a side view showing the cover 410 of the handheld electronic device 400 in FIG. 8 being rotated by an angle of 180° relative to the main body 420. FIG. 11 is a side view showing the cover 410 of the handheld electronic device 400 in FIG. 8 being rotated by an angle of 270° relative to the main body 420. FIG. 12 is a side view showing the cover 410 of the handheld electronic device 400 in FIG. 8 being rotated by an angle of 360° relative to the main body 420.

In FIGS. 8 and 8C, when the cover 410 flips over a top surface 424 of the main body 420, the geometric relationship is governed by the first equation, namely, $S^2=R^2+(X+Y)^2$. In the present embodiment, the length S is greater than the length R and the distance X is greater than the distance Y. When the first casing 410 shown in FIG. 8 rotates 90° to reach the position shown in FIG. 9, the angle between the cover 410 and the main body 420 is 90°. Thereafter, when the first casing 410 shown in FIG. 9 rotates another 90° to reach the position shown in FIG. 10, the second equation, namely, S+Y=R+X, must be satisfied. At this position, the angle between the cover 410 and the main body 420 is 180°. In FIGS. 11 and 12, the cover 410 rotates respectively 270° relative to the main body 420 and 360° relative to the main body 420. At the position of FIG. 12, the cover 410 abuts a bottom surface of the main body 420.

Therefore, if the geometry relationship of the lever 440 and the hinge structure 430 and their connections with the cover 410 and main body 420 satisfies the two aforementioned equations, the cover 410 can rotate up to 360° relative to the main body 420 and the position of the cover 410 relative to the main body 420 can be always ascertained throughout the rotation of the cover 410.

In the following table, different examples of values of R, X, Y and S that meet the two aforementioned equations are listed. With these values, a person skilled in the art can readily construct the handheld electronic device 400 in accordance with the second embodiment of the present invention with a variety of sizes.

| R | X | Y | S | R + X | S + Y |
|---|---|---|---|---|---|
| 2.000 | 1.000 | 0.500 | 2.500 | 3.000 | 3.000 |
| 2.000 | 2.000 | 0.667 | 3.333 | 4.000 | 4.000 |
| 2.000 | 3.000 | 0.750 | 4.250 | 5.000 | 5.000 |
| 2.000 | 4.000 | 0.800 | 5.200 | 6.000 | 6.000 |
| 2.000 | 5.000 | 0.833 | 6.167 | 7.000 | 7.000 |
| 2.000 | 6.000 | 0.857 | 7.143 | 8.000 | 8.000 |
| 2.000 | 7.000 | 0.875 | 8.125 | 9.000 | 9.000 |
| 2.000 | 8.000 | 0.889 | 9.111 | 10.000 | 10.000 |
| 3.000 | 1.000 | 0.600 | 3.400 | 4.000 | 4.000 |
| 3.000 | 2.000 | 0.857 | 4.143 | 5.000 | 5.000 |
| 3.000 | 3.000 | 1.000 | 5.000 | 6.000 | 6.000 |
| 3.000 | 4.000 | 1.091 | 5.909 | 7.000 | 7.000 |
| 3.000 | 5.000 | 1.154 | 6.846 | 8.000 | 8.000 |
| 3.000 | 6.000 | 1.200 | 7.800 | 9.000 | 9.000 |
| 3.000 | 7.000 | 1.235 | 8.765 | 10.000 | 10.000 |
| 3.000 | 8.000 | 1.263 | 9.737 | 11.000 | 11.000 |
| 3.000 | 9.000 | 1.286 | 10.714 | 12.000 | 12.000 |
| 4.000 | 1.000 | 0.667 | 4.333 | 5.000 | 5.000 |
| 4.000 | 2.000 | 1.000 | 5.000 | 6.000 | 6.000 |
| 4.000 | 3.000 | 1.200 | 5.800 | 7.000 | 7.000 |
| 4.000 | 4.000 | 1.333 | 6.667 | 8.000 | 8.000 |
| 4.000 | 5.000 | 1.429 | 7.571 | 9.000 | 9.000 |
| 4.000 | 6.000 | 1.500 | 8.500 | 10.000 | 10.000 |
| 4.000 | 7.000 | 1.556 | 9.444 | 11.000 | 11.000 |
| 4.000 | 8.000 | 1.600 | 10.400 | 12.000 | 12.000 |
| 4.000 | 9.000 | 1.636 | 11.364 | 13.000 | 13.000 |
| 4.000 | 10.000 | 1.667 | 12.333 | 140.000 | 14.000 |
| 4.000 | 11.000 | 1.692 | 13.308 | 15.000 | 15.000 |
| 4.000 | 12.000 | 1.714 | 14.286 | 16.000 | 16.000 |
| 5.000 | 1.000 | 0.714 | 5.286 | 6.000 | 6.000 |
| 5.000 | 2.000 | 1.111 | 5.899 | 7.000 | 7.000 |
| 5.000 | 3.000 | 1.364 | 6.636 | 8.000 | 8.000 |
| 5.000 | 4.000 | 1.538 | 7.462 | 9.000 | 9.000 |
| 5.000 | 5.000 | 1.667 | 8.333 | 10.000 | 10.000 |
| 5.000 | 6.000 | 1.765 | 9.235 | 11.000 | 11.000 |
| 5.000 | 7.000 | 1.842 | 10.158 | 12.000 | 12.000 |
| 5.000 | 8.000 | 1.905 | 11.095 | 13.000 | 13.000 |
| 5.000 | 9.000 | 1.957 | 12.043 | 14.000 | 14.000 |
| 5.000 | 10.000 | 2.000 | 13.000 | 15.000 | 15.000 |
| 5.000 | 11.000 | 2.037 | 13.963 | 16.000 | 16.000 |
| 5.000 | 12.000 | 2.069 | 14.931 | 17.000 | 17.000 |
| 5.000 | 13.000 | 2.097 | 15.903 | 18.000 | 18.000 |
| 5.000 | 14.000 | 2.121 | 16.879 | 19.000 | 19.000 |
| 5.000 | 15.000 | 2.143 | 17.857 | 20.000 | 20.000 |

In the aforementioned table, the values of the R, X, Y, S of each row are set to express the dimensional proportions of theses dimensions in the handheld electronic device 400. There are three rows in the table in which the dimensional proportions of these dimensions are integrals, i.e., 3:3:1:5, 4:2:1:5 and 5:10:2:13 for R:X:Y:Z, by which the person can easily construct the handheld electronic device 400 which can operate perfectly smoothly. For those rows having values not being integral, a round off to the nearest hundredth thereof can be used. For example, the R:X:Y:Z of the last row can be rounded off to be 5:15:2.14:17.86. Due to operation tolerance, such round off will not too adversely affect the smoothness of the operation of the device 400.

In the present embodiment, the display screen (not shown) and the keyboard (not shown) are disposed on the cover 410 and the main body 420, respectively. When the cover 410 rotates 360° relative to the main body 420 to abut against the bottom surface of the main body 420 as shown in FIG. 12, the display screen and the keyboard face opposite directions. At this position, the user can easily input information to the device 400 through use of a stylus (not shown) tapping on the display screen, which in the preferred embodiment is a touch screen. Furthermore, at this position, the user can easily use the device 400 as a wireless Internet browser or a wireless PDA phone.

Figure 13:
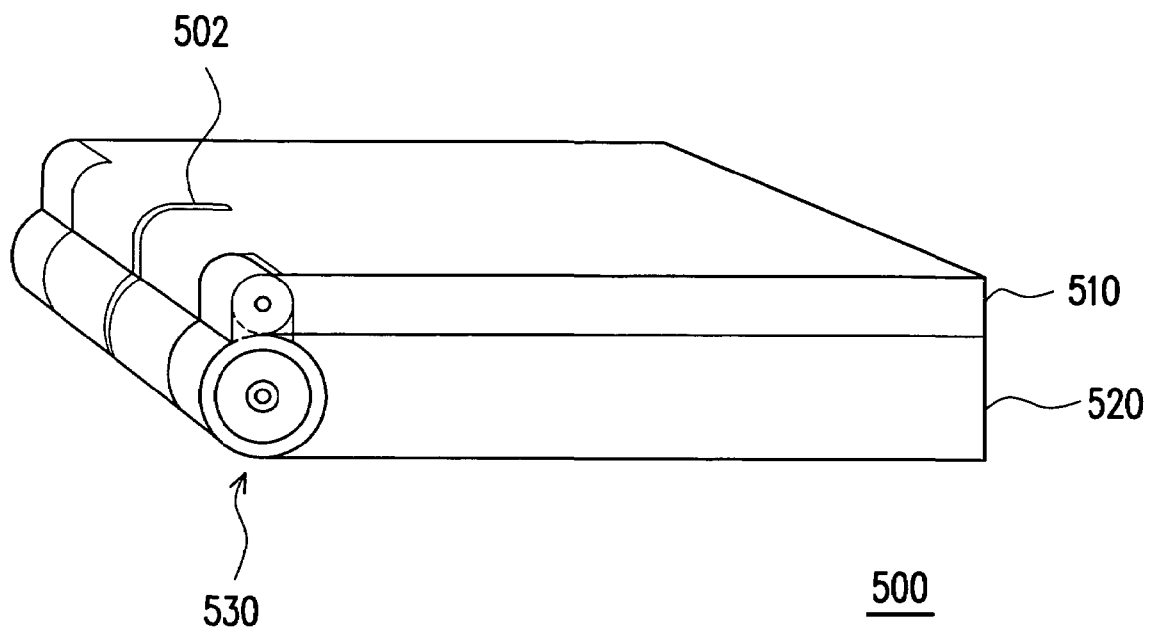
FIG. 13 is a perspective view showing a handheld electronic device according to a third preferred embodiment of the present invention.

In this embodiment of the present invention, although only one lever 440 is shown connected to one side of the device 400, it can be easily understood by persons skilled in the art that a second lever can be used to secure the other side of the device 400 to enhance the structural integrity and robustness of the device 400. FIG. 13 is a perspective view showing a handheld electronic device 500 in accordance with a third embodiment of the present invention, which differs from the second embodiment only regarding the disposition of the level. In the third embodiment, the lever (not shown) is no longer placed on a side of the handheld electronic device, but is placed in a slit 502 defined in a middle of a front end portion of the handheld electronic device 500. Like the second embodiment, the device 500 has a hinge structure 530 connecting with a first pivot portion of a cover 510 and a second pivot portion of a main body 520 of the device 500, respectively. Furthermore, the lever has two ends pivotably connected to the cover 510 and the main body 520 of the device 500, respectively. By such design, the lever is hidden in the device 500, thereby enhancing the aesthetic appeal of the device 500. The operation of the device 500 is the same as that of the device 400 of the second embodiment.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A handheld electronic device, comprising:
    a first casing having a first pivot portion;
    a second casing having a second pivot portion, wherein the first and the second pivot portions each has a plurality of teeth thereon, the teeth meshing with each other; and
    a hinge structure to which the first pivot portion of the first casing and the second pivot portion of the second casing are pivotably connected, the first casing being free to rotate 360° relative to the second casing, and a path of the first casing during its rotation relative to the second casing being predetermined, wherein
    the hinge structure comprises:
    a first axle cap;

two axle rods each having an end secured to the first axle cap, the axle rods extending in the first pivot portion of the first casing and the second pivot portion of the second casing, respectively; and a second axle cap connected to ends of the two axle rods distant from the first axle cap.

2. The handheld electronic device of claim 1, wherein the first casing is moved from a closed position of device in which the first casing abuts against the second casing to a position perpendicular to the second casing when one of the axle rods rotates 45° relative to the other one of the axle rods.

3. The handheld electronic device of claim 1, wherein the hinge structure further comprises two axle bushings fixed in the first pivot portion of first casing and the second pivot portion of the second casing, respectively, the two axle rods extending in the respective axle bushings.

4. A handheld electronic device, comprising:
a first casing having a first pivot portion;
a second casing having a second pivot portion, the first and second pivot portions each having teeth that mesh with each other;
a keyboard disposed on the first casing;
a monitor disposed on the second casing; and
a hinge structure to which the first and second pivot portions are hinged at a first hinged point and a hinged second point, respectively, wherein the keyboard moves from a position above the monitor to a position below the monitor after the first hinged point rotates an angle of 180° relative to the second hinged point, wherein
the hinge structure comprises:
a first axle cap;
two axle rods extending in the first pivot portion and the second pivot portion, respectively, the axle rods each having an end secured to the first axle cap; and
a second axle cap securely connecting with ends of the two axle rods distant from the first axle cap.

5. The handheld electronic device of claim 4, wherein the monitor is a touch screen.

6. A handheld electronic device, comprising:
a first casing having a first pivot portion;
a second casing having a second pivot portion;
a hinge structure to which the first pivot portion of the first casing and the second pivot portion of the second casing are hinged in a manner that the first casing can rotate up to 360 degrees relative to the second casing and move from a first position abutting against a top surface of the second casing to a second position abutting against a bottom surface of the second casing; and
means for ensuring a path of movement of the first casing during its rotation relative to the second casing to be predetermined wherein
the hinge structure comprises:
a first axle cap having two axle rods extending in the first pivot portion of the first casing and the second pivot portion of the second casing, respectively; and
a second axle cap that connects with ends of the two axle rods distant from the first axle cap.

7. The handheld electronic device of claim 6, wherein the means comprises a first set of protruding teeth formed on the first pivot portion and a second set of protruding teeth formed on the second pivot portion, the teeth meshing each other.

8. The handheld electronic device of claim 6, wherein the second casing is provided with a touch screen thereon.

9. The handheld electronic device of claim 8, wherein the first casing has a thickness equal to that of the second casing.

10. The handheld electronic device of claim 6, wherein the first casing is provided with a touch screen thereon.

11. The handheld electronic device of claim 6, wherein the first casing has a thickness smaller than that of the second casing.

12. The handheld electronic device of claim 6, wherein the first casing has a thickness equal to that of the second casing.

* * * * *